US006987892B2

(12) United States Patent
Edgar

(10) Patent No.: US 6,987,892 B2
(45) Date of Patent: Jan. 17, 2006

(54) METHOD, SYSTEM AND SOFTWARE FOR CORRECTING IMAGE DEFECTS

(75) Inventor: Albert D. Edgar, Austin, TX (US)

(73) Assignee: Eastman Kodak Company, Rochester, NY (US)

( * ) Notice: Subject to any disclaimer, the term of this patent is extended or adjusted under 35 U.S.C. 154(b) by 624 days.

(21) Appl. No.: 10/126,987

(22) Filed: Apr. 19, 2002

(65) Prior Publication Data

US 2003/0118249 A1   Jun. 26, 2003

Related U.S. Application Data

(60) Provisional application No. 60/285,657, filed on Apr. 19, 2001.

(51) Int. Cl.
*G06K 9/40* (2006.01)
(52) U.S. Cl. ............... 382/254; 382/309; 345/618; 345/647; 348/607
(58) Field of Classification Search ............... 382/254, 382/309, 311, 257, 274; 348/607; 345/595, 345/647, 612, 618

See application file for complete search history.

(56) References Cited

U.S. PATENT DOCUMENTS

| 4,260,899 | A | 4/1981 | Baker | 250/563 |
|---|---|---|---|---|
| 4,301,469 | A | 11/1981 | Modeen et al. | 358/75 |
| 4,302,108 | A | 11/1981 | Timson | 356/359 |
| 4,462,860 | A | 7/1984 | Szmanda | 156/626 |
| 4,670,779 | A | 6/1987 | Nagano | 358/75 |

(Continued)

FOREIGN PATENT DOCUMENTS

DE   28 21 868 A1   11/1979

(Continued)

OTHER PUBLICATIONS

Dayton et al., Book Publication, 2000, "Photoshop 5/5.5 WOW! Book". (pp. 172-180).*

(Continued)

*Primary Examiner*—Bhavesh M. Mehta
*Assistant Examiner*—Manav Seth
(74) *Attorney, Agent, or Firm*—Simon Galasso & Frantz; David A. Novais

(57) ABSTRACT

A method, system and software are disclosed for correcting defects formed in a physical medium of an original image. Multiple scans of the original image are recorded, where the multiple scans have different properties. For example, the angle of the light incident to the physical medium or the properties of the light may be changed between scans of original image. The multiple scans can be used to generate a reference image from which defect corrections are made. Alternatively, a reference image can be generated directly from the original image. The multiple scans can also be used to determine the degree of defectiveness and/or an estimate of the signal strength of each portion of the original image. A decision is made on whether or not an image portion having one or more defects should be corrected, where the decision can be based on an evaluation of the potential benefit compared to the potential damage caused by correction of an image portion. In one embodiment, the potential benefit is proportional to the degree of defectiveness, while the potential damage is proportional to the image information that may be removed by correction. If the decision is made to correct an image portion, a variety of methods may be implemented to correct the image portion, such as cloning information from non-defective image portions surrounding the defective image portion. The present invention finds particular use in image capturing systems, such as flatbed scanners, photocopiers, facsimile machines, and the like.

54 Claims, 6 Drawing Sheets

U.S. PATENT DOCUMENTS

| | | | |
|---|---|---|---|
| 4,677,465 A | 6/1987 | Alkofer | 358/80 |
| 4,680,638 A | 7/1987 | Childs | 358/214 |
| 4,700,229 A | 10/1987 | Herrmann et al. | 358/166 |
| 4,775,238 A | 10/1988 | Weber | 356/431 |
| 4,796,061 A | 1/1989 | Ikeda et al. | 355/73 |
| 4,827,351 A * | 5/1989 | Sakamoto | 358/447 |
| 4,845,551 A | 7/1989 | Matsumoto | 358/80 |
| 4,933,566 A | 6/1990 | Masaaki et al. | 250/563 |
| 4,937,720 A | 6/1990 | Kirchberg | 363/41 |
| 4,969,045 A | 11/1990 | Haruki et al. | 358/228 |
| 4,972,091 A | 11/1990 | Cielo et al. | 250/562 |
| 4,989,973 A | 2/1991 | Noso et al. | 356/239 |
| 4,994,918 A | 2/1991 | Lingemann | 358/214 |
| 5,003,379 A | 3/1991 | Moore, Jr. et al. | 358/54 |
| 5,010,401 A | 4/1991 | Murakami et al. | 358/136 |
| 5,047,968 A | 9/1991 | Carrington et al. | 364/574 |
| 5,058,982 A | 10/1991 | Katzir | 385/33 |
| 5,091,972 A | 2/1992 | Kwon et al. | 382/54 |
| 5,097,521 A | 3/1992 | Massmann | 382/54 |
| 5,149,960 A | 9/1992 | Dunne et al. | 250/226 |
| 5,155,596 A | 10/1992 | Kurtz et al. | 358/214 |
| 5,200,817 A | 4/1993 | Birnbaum | 358/80 |
| 5,266,805 A | 11/1993 | Edgar | 250/330 |
| 5,267,030 A | 11/1993 | Giorgianni et al. | 358/527 |
| 5,291,286 A | 3/1994 | Murakami et al. | 348/469 |
| 5,311,310 A | 5/1994 | Jozawa et al. | 348/416 |
| 5,335,086 A | 8/1994 | Kitamura | 358/431 |
| 5,371,542 A | 12/1994 | Pauli et al. | 348/262 |
| 5,447,811 A | 9/1995 | Buhr et al. | 430/20 |
| 5,448,380 A | 9/1995 | Park | 358/520 |
| 5,452,018 A | 9/1995 | Capitant et al. | 348/651 |
| 5,461,655 A * | 10/1995 | Vuylsteke et al. | 378/62 |
| 5,465,155 A | 11/1995 | Edgar | 385/500 |
| 5,465,163 A | 11/1995 | Yoshihara et al. | 358/444 |
| 5,477,345 A | 12/1995 | Tse | 358/500 |
| 5,509,086 A | 4/1996 | Edgar et al. | 382/167 |
| 5,516,608 A | 5/1996 | Hobbs et al. | 430/30 |
| 5,552,904 A | 9/1996 | Ryoo et al. | 358/518 |
| 5,555,194 A * | 9/1996 | Cok | 382/254 |
| 5,561,611 A | 10/1996 | Avinash | 364/553 |
| 5,565,931 A | 10/1996 | Girod | 348/675 |
| 5,568,270 A | 10/1996 | Endo | 358/298 |
| 5,581,376 A | 12/1996 | Harrington | 358/518 |
| 5,582,961 A | 12/1996 | Giorgianni et al. | 430/508 |
| 5,583,950 A | 12/1996 | Prokoski | 382/212 |
| 5,589,887 A | 12/1996 | Wischermann | 348/616 |
| 5,606,631 A * | 2/1997 | Weiss et al. | 382/275 |
| 5,608,547 A | 3/1997 | Nakatani et al. | 358/505 |
| 5,641,596 A | 6/1997 | Gray et al. | 430/21 |
| 5,666,443 A | 9/1997 | Kumashiro | 382/266 |
| 5,673,336 A | 9/1997 | Edgar et al. | 382/167 |
| 5,721,624 A | 2/1998 | Kumashiro et al. | 358/450 |
| 5,726,773 A | 3/1998 | Mehlo et al. | 358/474 |
| 5,729,631 A | 3/1998 | Wober et al. | 382/232 |
| 5,771,107 A | 6/1998 | Fujimoto et al. | 358/464 |
| 5,808,674 A | 9/1998 | Adams, Jr. et al. | 348/273 |
| 5,892,595 A | 4/1999 | Yamakawa et al. | 358/530 |
| 5,923,042 A | 7/1999 | Mietta et al. | 250/559.06 |
| 5,930,388 A | 7/1999 | Murakami et al. | 382/167 |
| 5,963,662 A | 10/1999 | Vachtsevanos et al. | 382/150 |
| 5,969,372 A | 10/1999 | Stavely et al. | 250/559.42 |
| 5,979,011 A | 11/1999 | Miyawaki et al. | 15/308 |
| 5,982,941 A | 11/1999 | Loveridge et al. | 382/260 |
| 5,982,951 A | 11/1999 | Katayama et al. | 382/284 |
| 5,991,444 A | 11/1999 | Burt et al. | 382/232 |
| 6,005,987 A | 12/1999 | Nakamura et al. | 382/294 |
| 6,057,040 A | 5/2000 | Hage | 428/447 |
| 6,075,905 A | 6/2000 | Herman et al. | 382/284 |
| 6,078,051 A | 6/2000 | Banton et al. | 250/341.1 |
| 6,078,701 A | 6/2000 | Hsu et al. | 382/294 |
| 6,101,273 A | 8/2000 | Matama | 382/169 |
| 6,128,416 A | 10/2000 | Oura | 382/284 |
| 6,239,886 B1 | 5/2001 | Klasser et al. | 358/518 |
| 6,574,374 B1 * | 6/2003 | Acharya | 382/257 |
| 6,704,435 B1 * | 3/2004 | Imaino et al. | 382/108 |
| 6,775,419 B2 * | 8/2004 | Maeda et al. | 382/275 |

FOREIGN PATENT DOCUMENTS

| | | |
|---|---|---|
| DE | 196 36 867 C1 | 1/1998 |
| EP | 1 547 811 | 6/1979 |
| EP | 0 422 220 A1 | 4/1991 |
| EP | 0 482 790 B1 | 4/1992 |
| EP | 0 527 097 A2 | 2/1993 |
| EP | 0 569 142 A1 | 11/1993 |
| EP | 0 624 848 A2 | 11/1994 |
| EP | 0 669 753 A2 | 8/1995 |
| EP | 0 716 538 A2 | 6/1996 |
| EP | 0 751 670 A2 | 1/1997 |
| EP | 0 768 621 A2 | 4/1997 |
| EP | 0 794 454 A2 | 9/1997 |
| EP | 0 816 833 A2 | 1/1998 |
| EP | 0 816 833 A3 | 8/1998 |
| EP | 0 893 914 A2 | 1/1999 |
| GB | 2 283 633 A | 5/1995 |
| JP | 4-291139 | 10/1992 |
| JP | 11185028 | 7/1999 |
| JP | 2000-13604 | 1/2000 |
| JP | 2000-196813 A | 7/2000 |
| WO | WO 84/02019 | 5/1984 |
| WO | WO 89/06890 | 7/1989 |
| WO | WO 90/01240 | 2/1990 |
| WO | WO 91/09493 | 6/1991 |
| WO | WO 92/05469 | 4/1992 |
| WO | WO 95/15530 | 6/1995 |
| WO | WO 97/16028 | 5/1997 |
| WO | WO 98/31142 | 7/1998 |
| WO | WO 98/34397 | 8/1998 |
| WO | WO 99/40729 | 8/1999 |
| WO | WO 01/48694 | 7/2001 |

OTHER PUBLICATIONS

Baxes, Book Publication, 1994, "Digital Image Processing: principles and application". (pp 62-77, 123-155, 330-334).*

Lennox et al., Book Publication, Jan. 1999, "Adobe Photoshop 5.0 Certification Guide". (219-223).*

*New Adaptive Vector Filter Based on Noise Estimate*, Mei Yu, et al., IEICE Trans Fundamentals, vol. E82, No. 6, Jun., 1999.

*A Robust Method for Parameter Estimation of Signal-Dependent Noise Models in Digital Images*, B. Aiazzi, et al., IEEE, 1997, pp. DSP 97—601-604.

*A Regularized Iterative Image Restoration Algorithm*, Aggelos K. Katsaggelos, et al., IEEE, 1991, pp. 914-929.

*Adaptive Fourier Threshold Filtering: A Method to Reduce Noise and Incoherent Artifacts in High Resolution Cardiac Images*, M. Doyle, et al., 8306 Magnetic Resonance in Medicine, May, 31, 1994, No. 5, Baltimore, MD., pp. 546-550.

*Anisotropic Spectral Magnitude Estimation Filters for Noise Reduction and Image Enhancement*, Til Aach, et al., IEEE, 1996, pp. 335-338.

*Adaptive-neighborhood filtering of images corrupted by signal-dependent noise*, Rangaraj M. Rangayyan et al., Applied Optics, vol. 37, No. 20, Jul. 10, 1998, pp. 4477-4487.

*Digital Imaging Equipment White Papers*, Putting Damaged Film on Ice, A Technical Discussion of Advances in Digital Imaging, Nikon Corporation, http://www.nikonusa.com/reference/whitepapers/imaging/ditechdisc.html, Aug. 5, 1999.

*Local Cosine Transform—A Method for the Reduction of the Blocking Effect in JPEG*, Gil Aharoni, et al., Journal of Mathematical Imaging and Vision, 3, 7-38, 1993.

*Digital ICE*, Applied Science Fiction, Inc., http://www.asf.com/html/o_products/iceprod.html, Aug. 5, 1999.

*About Digital ICE Technology*, Applied Science Fiction, Inc., http://www.asf.com/html/o_products/icetech.html. Aug. 5, 1999.

*2-D Adaptive Volterra Filter for 2-D Nonlinear Channel Equalisation and Image Restoration*, J.N. Lin, et al., Electronic Letters, vol. 28, No. 2, Jan. 16, 1992, pp. 180-182.

* cited by examiner

METHOD, SYSTEM AND SOFTWARE FOR CORRECTING IMAGE DEFECTS

CROSS REFERENCE TO RELATED APPLICATIONS

This application claims benefit under 35 U.S.C. §119 of U.S. provisional patent application Ser. No. 60/285,657, entitled Method, System And Software For Correcting Image Defects, which was filed on Apr. 19, 2001.

FIELD OF THE INVENTION

The present invention relates generally to image processing and more particularly to correcting image defects.

BACKGROUND OF THE INVENTION

Document copiers, facsimile machines, film and image scanners, optical character recognition systems, and many other devices depend on accurately capturing an image formed in a physical medium. However, the physical mediums of images often have defects, such as scratches, creases, folds, or dust on the surface of the physical medium, that reduce the potential for an accurate capturing of the image. For example, family heirloom photographs often have large creases and scratches caused by many years of mishandling. Attempts to reproduce images without correction of the defects often result in recorded images having a considerable reduction in visual appeal or image quality.

Conventional methods have been developed to attempt to correct defects found in an image. For example, in one conventional method a defective area of an image is filled in using a non-defective region of the image to produce a corrected image. Another conventional method involves manual touching-up of the image to produce a corrected image. While these conventional methods may work adequately on small defects, they often fail to properly correct extensive defects, such as large creases in a photograph caused by folding. Additionally, conventional methods often correct defects in an image without regard for the potential of the correction to cause more damage than benefit. Furthermore, correction methods vary in their effectiveness on correcting different types of defects. Conventional methods do not distinguish the improvements between different types of correction methods.

SUMMARY OF THE INVENTION

In one implementation of the invention, a method for correcting a defective image is provided. In one embodiment, a degree of defectiveness of an image portion is determined. Based in part on the degree of defectiveness, the benefit of correcting the image portion and damage that would be caused by correcting the image portion is evaluated. The image portion is corrected if the benefit of correcting the image portion is greater than the damage that would be caused by correcting the image portion.

In another implementation of the invention, a system for correcting image defects is provided. The system comprises at least one processor, memory operably associated with the processor, and a set of programs to be stored in the memory and executed by the processor. The program of instructions includes instructions for the processor to determine a degree of defectiveness in an image portion and to evaluate, based at least in part on the degree of defectiveness, a benefit of correcting the image portion and damage that would be caused by correcting the image portion. The program of instructions further includes instructions for the processor to correct the image portion based on the evaluation.

In yet another implementation, a computer readable medium tangibly embodying a program of instructions is provided. In one embodiment, the program of instructions includes instructions to manipulate the processor to determine a degree of defectiveness in an image portion and to evaluate, based at least in part on the degree of defectiveness, a benefit of correcting the image portion and damage that would be caused by correcting the image portion. The program of instructions further includes instructions to manipulate the processor to correct the image portion based on the evaluation.

The various embodiments of the invention have several important technical advantages. Various embodiments of the present invention may have none, some, or all of these advantages. For example, an advantage of at least one embodiment is that the quality of corrected images is generally improved over conventionally reproduced and corrected images. Another advantage of at least one embodiment is that damage in a reproduced image caused by improperly corrected defects can be avoided. Yet another advantage of at least one embodiment is that calculations to improve image quality can be performed relatively quickly, due to a lower processing overhead and less user intervention than conventional methods.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF AN EMBODIMENT OF THE INVENTION

Figure 1A:
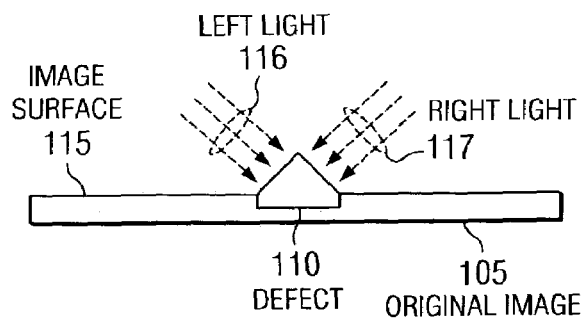
FIG. 1 is a diagram illustrating various image capture and combination methods according to at least one embodiment of the present invention.
Figure 1B:
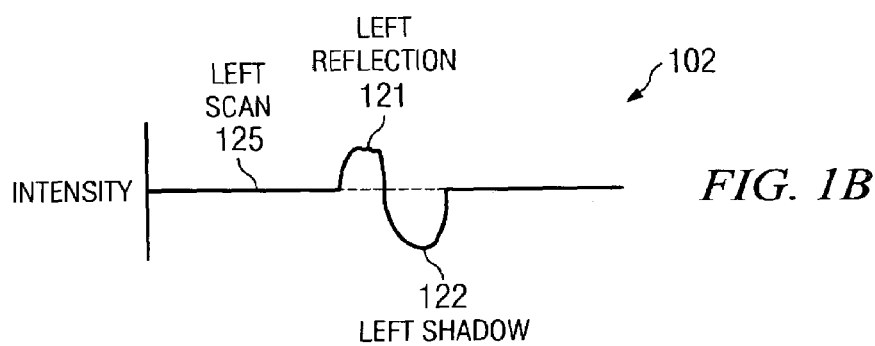
Figure 1C:
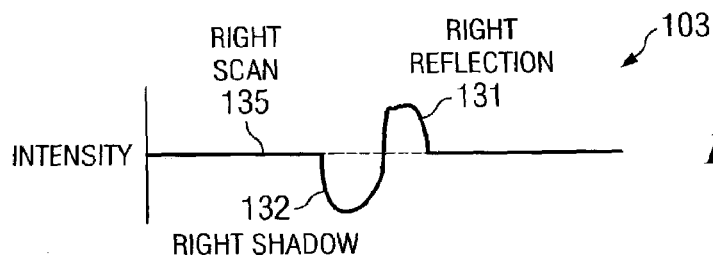
Figure 1D:
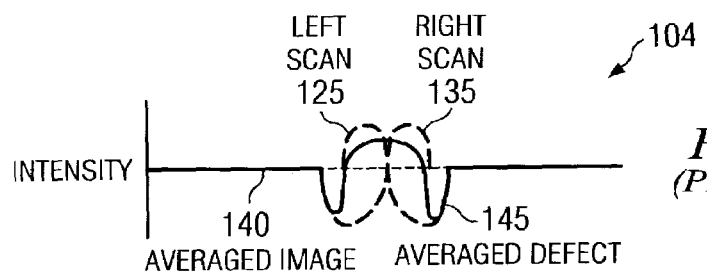
Figure 1E:
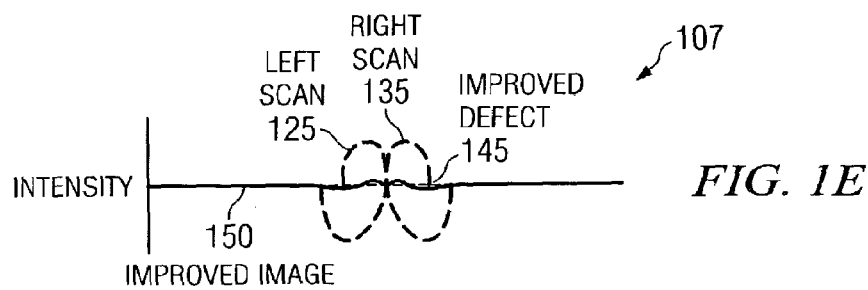

FIGS. 1–10 illustrate a method, system and software for correcting defects formed in the physical medium of an original image. As described in greater detail below, the invention generally involves an improved technique for producing a corrected image. In particular, different methods for correcting defects often produces varying results that may even be worse than the defect itself. In one embodiment, the amount of defectiveness of a particular image region is determined. Defectiveness can be determined using a number of parameters, including a measure or estimate of the signal strength. A decision is made on whether or not the image portion having one or more defects should be corrected. In a particular embodiment, the decision is based on an evaluation of the potential benefit of correcting the defect compared to the potential damage caused by correcting the defect, which can vary by the particular defect correction method. In a particular, the potential benefit is proportional to the degree of defectiveness, while the potential damage is proportional to the image information that may be removed by correction. If the decision is made to correct an image portion, the best or a any number of methods may be implemented to correct the image portion.

Referring now to FIG. 1, various charts depicting methods for image defect correction are illustrated according to at least one embodiment of the present invention. Chart 101 illustrates a cross section of a physical medium representative of a captured image, herein referred to as original image 105. For example, original image 105 could be captured in photographic film, a photograph print, a magazine page, and the like. As a result of various processes or activities, the original image 105 may have a number of defects located on the surface of the physical media (defect 110). The word "defect," as used herein, refers to an imperfection on or in the physical medium, which can be, but is not limited to, a scratch, a crease, a fold, or dust on the surface of the physical medium. The word "defect" may also refer to imperfections on or in the scanning equipment, such as scratches, smudges, fingerprints, or dust on the platen. Other characteristics of a physical medium or scanning equipment that can obscure or distort a captured image of the physical medium may also be considered "defects." For example, matte finishes on photographs, while not imperfections, tend to produce lines in a digital image when scanned, and therefore may also be considered to be a "defect" in the physical medium.

Image processing systems (see FIGS. 9 and 10) often try to minimize the distortion or error caused by defect 110 on image surface 115 by scanning or capturing original image 105 a number of times using light from various angles with reference to image surface 115. Since the physical characteristics of defect 110 interact differently with light from different angles, the multiple image captures at different light angles may be combined to generate a captured image with higher image quality than an image captured using only one image scan at one light angle. For example, in one embodiment, image surface 115 is subjected to left light 116 and right light 117. Although light emitted from the left of image surface 115 (left light 115) and the right (right light 117) is illustrated in FIG. 1, a number of different angles and/or image scans may be used. For example, three scans may be used to capture original image 105: a scan using light from the top of image surface 115; a scan using light from the left (left light 116); and a scan using light from the right (right light 117). Note that the term "light," as used herein, may refer to any suitable portion of the electromagnetic spectrum, such as visible light, infrared light, ultraviolet light, and the like, or a combination thereof.

By subjecting defect 110 to left light 116, left scan 125 may be generated, as illustrated in chart 102. Since defect 110 is illustrated in FIG. 1 as protruding from image surface 115, in one embodiment, light illuminating defect 110 from the left will generate light reflection 121 and left shadow 122 as a result of the interaction of left light 116 with defect 110. Similarly, right scan 135, as illustrated in chart 103, may be generated as a result of the interaction of right light 117 with defect 110, resulting in right reflection 131 and right shadow 132. It will be appreciated that characteristics of left scan 125 and right scan 135 may vary depending on the shape of the defect, the angles of the light sources with respect to the defect, the composition of the light, etc. It will also be appreciated that although left scan 125 and right scan 135 are illustrated as symmetrical in FIG. 1, they may also take shapes or characteristics different from each other. For example, if right light 117 strikes image surface 115 at an angle more perpendicular than left light 116, then right scan 135 may have a narrower shadow region (right shadow 132) caused by defect 110 than the shadow region (left shadow 122) generated by the interaction of left light 116 with defect 110.

As illustrated in chart 104, a common method for attempting to correct a defect in original image 105 is by averaging multiple scans of original image 105. For example, left scan 125 and right scan 135 may be combined to generate averaged image 140. In this case, the representations of defect 110 for each scan 125, 135 are combined to generated averaged defect 145, which may have improved image characteristics or quality over original image 105, left scan 125, and/or right scan 125. However, as illustrated, significant artifacts from scans 125, 135 may remain, such as deep shadow regions and high peaks, that detract from the quality or visual appeal of the image.

As discussed in greater detail subsequently, various implementations of the present invention use multiple scans (such as scans 125, 135) to improve the image quality and/or visual appeal of original image 105. For example, as illustrated in chart 107, left scan 125 and right scan 135 may be processed according to the principles disclosed herein generate improved image 150. Improved image 150, in one embodiment, includes improved defect 145. As illustrated, improved defect 145 has minimal, if any, deviation from the desired, optimal, or actual image intensity in the location on improved image 150 coinciding with the location of defect 110 on original image 105. Since improved defect 145, in one embodiment, more closely approximates the underlying image portion altered by defect 110 than the averaging method illustrated in chart 104, improved image 150 can be said to have improved image quality or visual appeal relative to averaged image 140. In one embodiment, improved defect 145 is generated by cloning information from one or more image portions surrounding defect 110 into the image portion having defect 110. In another embodiment, a combinational or averaging method as discussed with reference to chart 104 is used and improved upon to generate improved image 150.

Figure 2:
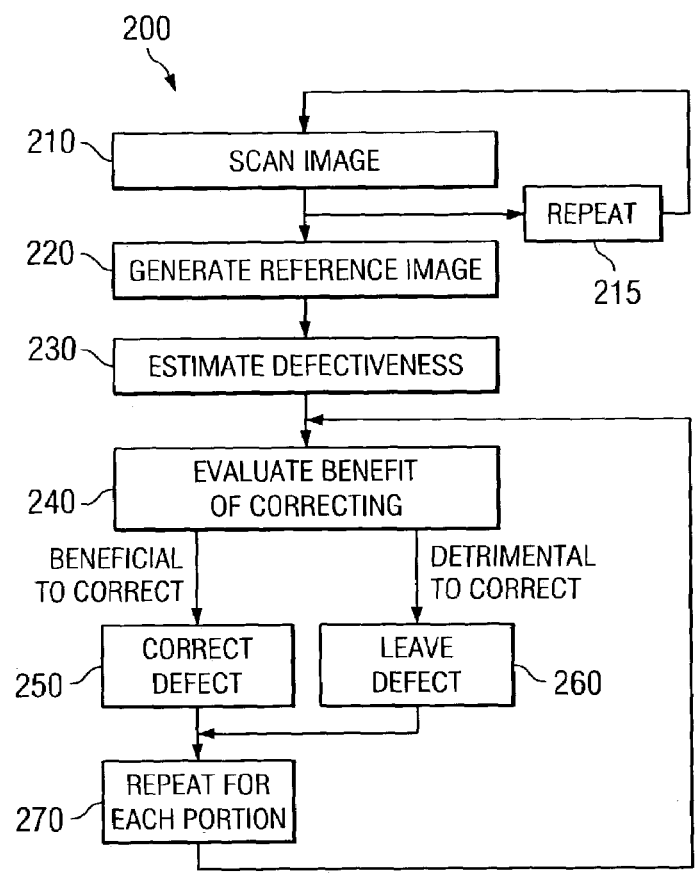
FIG. 2 is a flow diagram illustrating a method for correcting defects according to at least one embodiment of the present invention.

Referring now to FIG. 2, a flow diagram illustrating a method for defect correction is illustrated according to at least one embodiment of the present invention. The method, herein referred to as correction method 200, initiates with step 210, where a representation of an image captured in or on a physical medium is captured or scanned using light from a first angle relative to the physical medium and/or using light with a first property or characteristic. The representation of the image may be captured using a scanner, a digital camera, a copier, a facsimile machine, an optical character recognition system, and the like. The process of capturing a representation of the image in the physical medium is repeated in step 215 for a desired number of times. In one embodiment, the angle of the light used to capture the images may be altered between image captures, the frequency or type of light used to capture the representations of the image may be changed between image captures (step 210), or a combination thereof. For example, in a first step 210, a first representation of original image 105 (FIG. 1) may be captured using left light 116 (FIG. 1), wherein left light 116 includes white light. In this example, a second representation of original image 105 is captured in a second step 210, where the second representation is captured using right light 117 (FIG. 1), where right light 117 also includes visible light. In this example, this process is repeated in step 215 where a third representation is captured in a third step 210, where the third representation is captured using a light from the top of original image 105 (not shown), wherein the light includes infrared light.

It will be appreciated that any combination of image captures or scans having various light angles and/or light characteristics may be used as appropriate. For ease of discussion of the following steps, an embodiment where two representations of original image 105 are captured in steps 210–215, where one representation is left scan 125 and the other representation is right scan 135, as illustrated in FIG. 1. Although this embodiment will be illustrated for sake of clarity, any mention or reference to this embodiment may apply to any or all embodiments of the present invention unless otherwise noted.

In step 220, a reference image is generated. In one embodiment, the reference image is generated by combining two or more representations of original image 105 as illustrated with reference to chart 104 of FIG. 1. For example, left scan 125 and right scan 135 (FIG. 1) may be added together, effectively averaging the two scans. In another embodiment, a reference image is recorded directly from original image 105. In other embodiments, a reference image may be generated using a variety of methods, such as taking the maxima or the minima of one or more representations, passing one or more representations through a low pass filter or a high pass filter, such as an input impulse response filter, and the like. A reference image may also be generated directly from a recording of original image 105. In at least one embodiment, the purpose of the generation of the reference image in step 220 is to generate a base image having the most image quality and/or least amount of error as a result of defects. In this case, the base image may then be used as the basis for defect correction. Methods for generating a reference image are discussed subsequently in greater detail with reference to FIG. 3.

In step 230, the degree of defectiveness of portions of original image 105 (FIG. 1) is determined. In one embodiment, the degree of defectiveness is determined by comparing the intensity values of two or more representations of original image 105. For example, the intensity values for each pixel of left scan 125 could be compared with the intensity value of the corresponding pixel of right scan 135, and the degree of defectiveness could be determined from the similarity or difference of the two values. Methods for determining the degree of defectiveness of portions of images are discussed in greater detail with reference to FIG. 4.

In step 240, the benefit of correcting an image portion is compared to the damage caused by correcting the image portion. In one embodiment, a threshold is determined, and a signal strength or other value associated with each image portion, such as a pixel, is compared to the threshold to determine if it would be beneficial or detrimental to correct the image portion. For example, correcting a defect located in a portion of an image having a low spatial frequency, such as an image portion representative of a blue sky, is likely to improve image quality or visual appeal. However, correcting a portion of an image having a low degree of defectiveness and a high spatial frequency, such as an image portion representative of text, may adversely affect image quality or visual appeal. Methods for evaluating the benefit of correcting an image portion are discussed in greater detail with reference to FIG. 6.

If it is determined to be beneficial to correct a defective image portion, a defect correction process is applied to the image portion in step 250. In one embodiment, a defective image portion can be corrected by copying or cloning non-defective portions of the image into the defective portion, as discussed in greater detail with reference to FIG. 7. Otherwise, if it is determined to be detrimental to correct the defective image portion, in one embodiment, the defective image portion is ignored or skipped in step 260. In step 270, the process of evaluating the benefit of correcting a defective image portion (step 240) and the subsequent correction (step 250) or ignoring (step 260) of the defective image portion based on the evaluation is repeated for a desired number of image portions or all of the image portions. By applying correction method 200 to original image 105 (FIG. 1) having one or more defects (defect 110), in one embodiment, a resulting image is generated having improved image quality or visual appeal. In at least one embodiment, one or more steps of correction method 200 are implemented in a pyramidal decomposition method, discussed with reference to FIG. 8.

Figure 3:
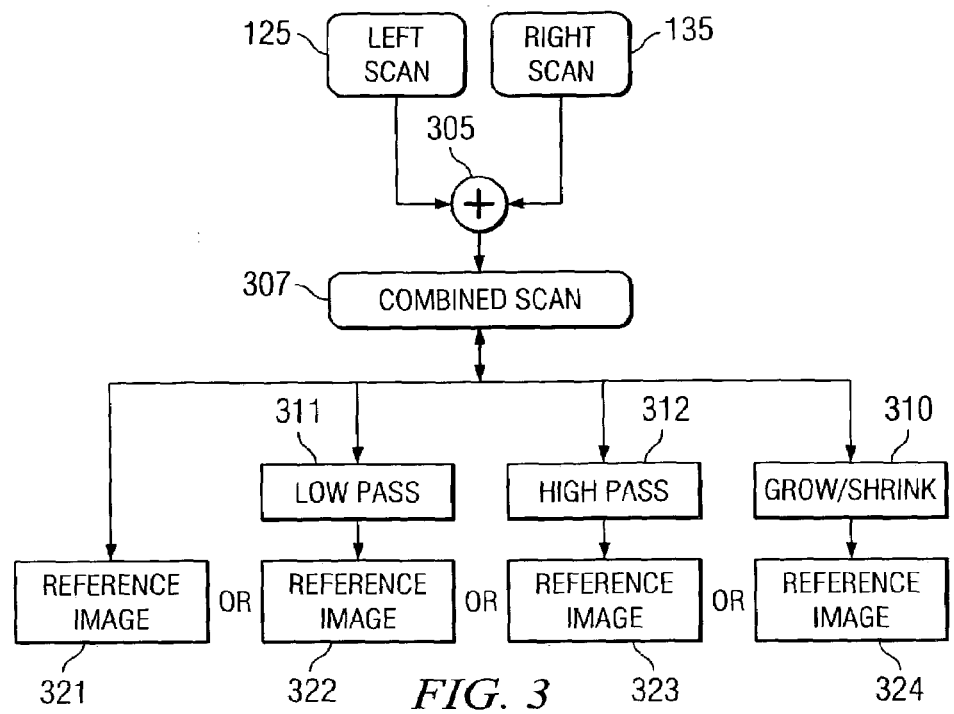
FIG. 3 is a flow diagram illustrating a method for generating a reference image according to at least one embodiment of the present invention.

As discussed previously with reference to step 220, a reference image may be generated from which defects in an image are corrected. Referring now to FIG. 3, various methods for generating a reference image are illustrated according to at least one embodiment of the present invention. Although the following methods may be applied to embodiments where more than two image captures representative of original image 105 (FIG. 1) are used, the methods will be discussed in the context of using two image captures, left scan 125 and right scan 135 (FIG. 1), for ease of illustration.

As discussed previously, in one embodiment, two or more image captures (left scan 125 and right scan 135) may be combined or averaged by combination module 305 to generate combined scan 307, which in turn may be used as reference image 321. As a result of the averaging of scans 125, 135, the effects of defect 110 (FIG. 1) may be reduced, resulting in a reference image 321 having decreased defectiveness compared to original image 105 (FIG. 1). For example, because left scan 125 and right scan 135 capture different sides of defect 110, each scan may have information that the other lacks. For example, left reflection 121 (FIG. 1) of left scan 125 could provide some information missing in right shadow 132 (FIG. 1) or right scan 135.

Alternatively, combination scan 307 is passed through a filter, such as an input impulse response filter, to remove portions of the combined result having values above a desired upper limit and/or below a desired lower limit. In one embodiment, combination scan 307 is passed through low pass filter 311 to generate reference image 322. In another embodiment, combination scan 307 is passed through high pass filter 312 to generate reference image 323.

In another embodiment, combination scan 307 is subjected to grow and shrink operations performed by grow/shrink module 310, generating reference image 324. A grow and shrink operation, in one embodiment, is used to create continuity between portions of original image 105 as discussed in greater detail with reference to FIG. 4.

Although various methods for generating a reference image (reference image 321, 322, 323, 324) have been illustrated, other methods may be used without departing from the spirit or the scope of the present invention. It will be appreciated that the illustrated methods may be implemented in concert to generate a reference image. For example, combined scan 307, after being passed through low pass filter 311, could be input to grow/shrink module 310. The output of grow/shrink module 310 then could have improved properties as compared to either reference image 322 or reference image 324 separately.

Figure 4:
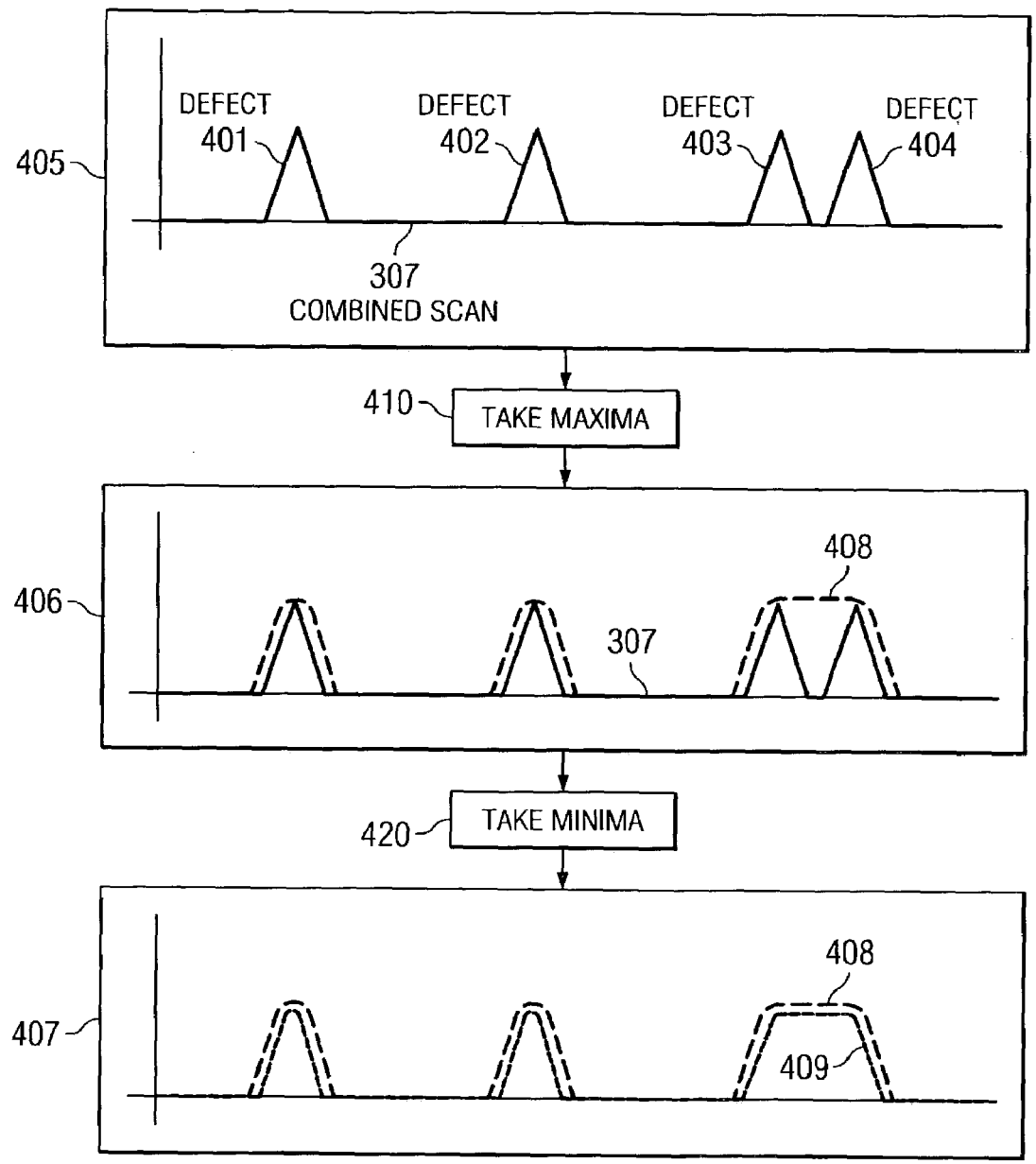
FIG. 4 is a flow diagram illustrating a method for performing a grow and shrink operation according to at least one embodiment of the present invention.

Referring to FIG. 4, a method for growing and shrinking a representation of an image is illustrated according to at least one embodiment of the present invention. As discussed previously, combined image 307, in one embodiment, has one or more grow and/or shrink functions performed on it by grow/shrink module 310 (FIG. 3). The purpose of the grow/shrink functions, in one embodiment, is to bridge a gap between defective portions that are relatively close. For example, if there is a discontinuous scratch (a defect) in a photographic print, defect correction may prove more effective and/or efficient if the discontinuities in the scratch are removed, thereby effectively making the scratch continuous.

As illustrated in chart 405, combined scan 307 includes defect representations 401–404, where each defect representation 401–405 is representative of a defect found in original image 105, such as defect 110 (FIG. 1). It will be appreciated that although defect representations 401–404 are illustrated as triangle-shaped peaks, the actual shapes of defect representations 401–404 are dependent on a number of factors, including the properties of the defect, the angle of one or more light sources relative to the defect, the type of light used, and the like.

In step 410, maxima scan 408, in one embodiment, is generated by taking a maximum over a region having a radius for some or all of the portions of combined scan 307. For example, the value for each pixel within a region of combined scan 307 may be replaced by the maximum value of all of the pixels within a predetermined radius of the pixel. In one embodiment, a radius of four pixels is used in step 410. For example, for each pixel, the value of all other pixels within a four pixel radius (81 pixels total) is evaluated and the largest value replaces the old value of the center pixel. This process may then be performed on the desired number of pixels to generate maxima scan 408. As illustrated in chart 406, by taking the maxima within a given radius, the size or overall magnitude of a defect representation may be increased, as demonstrated by the portions of maxima scan 408 representing defect representations 401, 402. However, if two or more defect representations are close (in relation to the predetermined radius), such as defect representations 403, 404, the taking of a maximum over a predetermined radius may bridge the two or more defect representations 403, 404, causing defect representations 403, 404 to appear as one continuous defect representation in maxima scan 408.

In step 420, minima scan 409, in one embodiment, is generated by taking a minimum over a region having a predetermined radius for some or all of the portions of maxima scan 408. For example, the value for each pixel within a region of maxima scan 408 may be replaced by the minimum value of all of the pixels within a predetermined radius of the pixel. The predetermined radius used for taking a minimum in step 420 may be the same or a different predetermined radius used to take a maximum in step 410. In one embodiment, a predetermined radius of three pixels is used in step 420 when a predetermined radius of four pixels is used in step 410. For example, for each pixel, the value of all other pixels within a three pixel radius (49 pixels total) is evaluated and the largest value replaces the old value of the center pixel. This process may then be performed on the desired number of pixels to generate minima scan 409. As illustrated in chart 407, minima scan 409, in one embodiment, sharpens or reduces representations of defects (defect representations 401–404) present in maxima scan 408. In one embodiment, minima scan 409 is used as reference image 324, while in another embodiment, minima scan 409 is subjected to one or more other processes, such as filtering, before being used as reference image 324.

Instead of taking a maximum (step 410) and then a minimum (step 420), in one embodiment, maxima scan 408 generated in step 410 may be averaged or combined with combined scan 307. For example, in one embodiment, maxima scan 408 and combined scan 307 may be averaged by adding the two and dividing by two. In another embodiment, a root-mean-square average function $PV = \overline{X^2 + Y^2} \div 2$ could be applied, where PV is the resulting pixel value, X is the pixel value from maxima scan 408 and Y is the pixel value from combined scan 307. In this case, the smaller pixel value is given greater emphasis is than in a simple average. For example, if a pixel in combined scan 307 has a value of 2 and the corresponding pixel in maxima scan 408 has a value of 10, the average value would be 6 (10+2/2), whereas a value of 5.1 is determined using the root-mean-square average. Other methods of averaging or combining maxima scan 408, minima scan 409, and/or combined scan 307 may be used without departing from the spirit or the scope of the present invention.

Figures 5, 6:
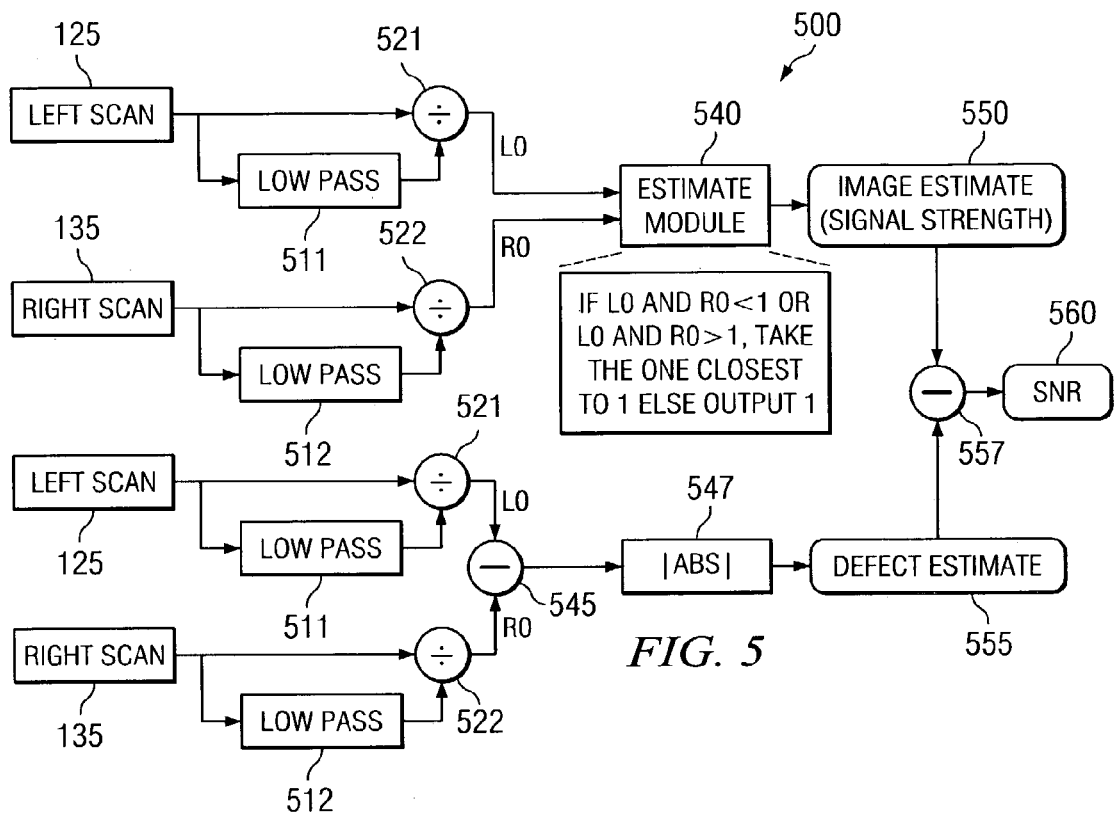
FIG. 5 is a block diagram illustrating a method for determining a signal estimate and a degree of defectiveness for a portion of an image according to at least one embodiment of the present invention.
FIG. 6 is a block diagram illustrating a method for evaluating the benefit and the damage of correcting an image portion according to at least one embodiment of the present invention.

Referring now to FIG. 5, a method for determining a degree of defectiveness for an image portion is illustrated according to at least one embodiment of the present invention. In the following discussion of estimate method 500, two representations of original image 105, left scan 125 and right scan 135 (FIG. 1), are used for illustrative purposes. However, any reference to this case may also apply to other various embodiments where estimate method 500 is implemented by using more than two representations of original image 105 (FIG. 1) and/or by using representations different from left scan 125 and right scan 135 unless otherwise noted.

In one embodiment, estimates of the signal strength of one or more image portions are generated by inputting left scan 125 into low pass filter 511 and inputting right scan 135 into low pass filter 512. Low pass filter 511 and low pass filter 512 may be the same filter or may be the same filter as filter 311 (FIG. 3). The output of low pass filter 511 and left scan 125 are input into division module 521 and the output of low pass filter 512 and right scan 135 are input into division module 522. Division module 521, in one embodiment, divides left scan 125 by the output of low pass 511, in effect outputting the results of a percentage high pass filter performed on left scan 125. Similarly, division module 522 can divide right scan 135 by the output of low pass 512, in effect outputting the results of a percentage high pass filter performed on right scan 135. The output of division module 521, herein referred to as L0, and the output of division module 522, herein referred to as R0, are input into estimate module 540.

In one embodiment, the output of estimate module 540 is determined by the following algorithm:

If L0<1 & R0<1 then output the value of L0 or R0 closest to 1;

Else if L0>1 and R0>1 then output the value of L0 or R0 closest to 1;

Else output 1;

The result of the previous algorithm as applied at estimate module 540 is an estimate of the signal strength (signal strength estimate 550) at one or more portions of original image 105 (FIG. 1). Other methods of estimating signal strength may be used without departing from the spirit or the scope of the present invention.

In order to generate an estimate of the degree of defectiveness of one or more portions of original image 105 (FIG. 1), in one embodiment, the output of division module 521, L0, is subtracted from the output of division module 522, R0, or vice versa, by subtraction module 545. Since the value associated with a degree of defectiveness should be a positive value, the absolute value of the output of subtraction module 545 is determined in absolute value module 547. The output of absolute value module 547, in one embodiment, is a measure of the degree of defectiveness for an image portion (defect estimate 555). For example, if L0 has a value of 0.75 and R0 has a value of 0.95, and if R0 is subtracted from L0 by subtraction module 545, the output would be −0.2. The negative value is corrected by absolute value module 547, resulting in value of 0.2 for defect estimate 555. In at least one embodiment, defect estimate 555 is subtracted from signal strength estimate 550 by subtraction module 557, resulting in signal-to-noise (SNR) ratio 560.

In at least one embodiment, the decision on whether or not to correct a portion of an image is based on an evaluation of the potential benefit of the correction versus the potential damage that may result from the correction. In this case, the benefit may be determined to be proportional to the degree of defectiveness (defect estimate 555). It stands to reason that the more defective an image portion is, the greater the potential for improvement. Similarly, the damage may be determined to be proportional to the amount of signal removed by correction (based on estimated signal strength 550). As a result, in at least one embodiment, a threshold value is used to determine whether or not to correct a defective image portion. The threshold value represents the threshold between a correction of a defect that would cause more damage than benefit and vice versa.

Referring now to FIG. 6, a method for evaluating the benefit of correcting one or more image portions is illustrated according to at least one embodiment of the present invention. In at least one embodiment, defect map 610 includes a matrix of defect estimates 550 (FIG. 5), where each defect estimate 555 is a measure of the degree of defectiveness of the corresponding image portion or pixel of original image 105 (FIG. 1), as discussed previously. For example, defect estimate 555 corresponding to the top left portion or pixel of original image 105 is located in the top left matrix element of defect map 610 and so on. Note that although the values for elements of defect map 610 are illustrated in FIG. 5 as whole numbers, the values for the elements of defect map 610 can include any positive real number, and are generally valued in the proximity of one. The values illustrated in defect map 610 of FIG. 6 vary from 0 to 4 for ease of illustration.

Defect map 610 can be used to determine threshold value 630 in step 620. For example, in one embodiment, the following formula is used:

$$\frac{\sum_{(x,y)} \text{defect\_estimate}(x, y)}{\sum_{(x,y)} 1} \times \text{scaling\_factor}$$

Where x represents the row index, y represents the column index, defect_estimate(x,y) represents defect estimate 555 for a pixel (or an image portion) at row x, column y of defect map 610, and scaling_factor represents a scaling factor used to scale the threshold. The scaling factor may be determined empirically, predetermined by a user or administrator, and the like. Note that an empirically determined universal scaling factor generally does not work well in practice because different images have different defect properties. However, in at least one embodiment, a scaling factor of 1.4 is used, as it has been determined to produce desirable results in most cases. It will be appreciated that the previous equation is, for all intents and purposes, a scaled average of the estimated degree of defectiveness (defect estimate 555) over all the pixels (or image portions) of defect map 610 since the numerator is a sum of all defect estimates 550 and the denominator represents the number of elements of defect map 610. Other methods for determining threshold value 630 may be used without departing from the spirit or scope of the present invention. For example, threshold value 630 could include the median value of defect map 610, the minimum value, and the like.

In step 640, the values of defect map 610, in one embodiment, are compared against threshold value 630. If defect estimate 555 for a given element of defect map 610 is greater than threshold value 630, a value of 0 is placed in the corresponding element of goodness map 650. Similarly, if defect estimate 555 for a given element of defect map 610 is less than or equal to threshold value 630, a value of 1 is placed in the corresponding element of goodness map 650. For example, if threshold value 630 is determined to have a value of 1, all elements in defect map 610 having values less than or equal to 1 will have a value of 1 for the corresponding element of goodness map 650, and all elements having values greater than 1 will have a value of 0 for the corresponding element of goodness map 650. As a result of this comparison of defect estimate 555 to threshold value 630, goodness map 650, in one embodiment, represents a mapping of the relatively good portions. Accordingly, elements having a value of 1 in goodness map 650, in one embodiment, are deemed relatively less defective, and so correcting the corresponding image portions may result in more damage than good. On the other hand, elements having a value of 0, in one embodiment, are deemed to be relatively more defective, and so correcting the corresponding image portions probably would improve the image quality or visual appeal.

Alternatively, in other embodiments, SNR ratio 560 (FIG. 5) and/or signal strength estimate 550 (FIG. 5) are compared against threshold value 630 to generate goodness map 650 as appropriate. For example, threshold value 630 could be generated by averaging the value of signal strength estimate 550 (FIG. 5) for all of image portions, similar to the averaging method for defect estimate 555 discussed previously. In this case, defect map 610 could include values for signal strength estimate 550 for each pixel or image portion of original image 105 (FIG. 1). These values could be compared against threshold value 630 to generate goodness map 650. However, unlike the previous method using defect estimate 555, if the value for signal strength estimate 550 for a given image portion exceeds threshold value 630, a value of 1 is placed in the corresponding element of goodness map 650, otherwise a value of 0 is placed in the corresponding element. This differs from the previous embodiment because a higher signal strength (signal strength estimate 550) generally indicates a less defective image portion, and vice versa. In another embodiment, a combination of defect estimate 555 and signal strength estimate 550 may be used to determine whether a defective region should be corrected.

Figure 7:
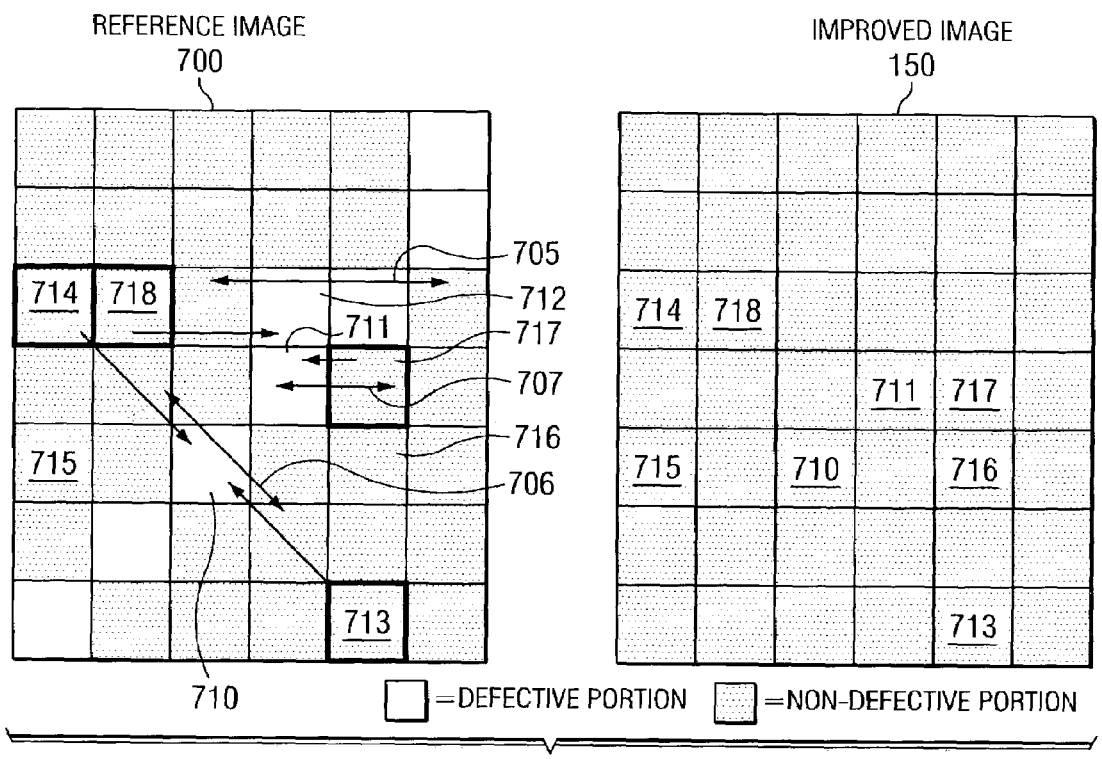
FIG. 7 is a block diagram illustrating a method for defect correction using cloning according to at least one embodiment of the present invention.

Referring next to FIG. 7, a method for correcting defective image portions is illustrated according to at least one embodiment of the present invention. As discussed previously, in one embodiment, a reference image (reference image 700) generated from multiple scans of original image 105 (FIG. 1) is used to generate improved image 150. Reference image 700, as used herein, is used to refer to one or more of reference images 321–324 generated using various methods as discussed with reference to FIG. 3, as well as reference images generated using other methods as appropriate. Note that the term "pixel" and "image portion" may be used interchangeably in the following discussion unless otherwise noted.

As illustrated in FIG. 7, reference image 700 includes a matrix of image portions, where each image portion has an associated value in a goodness map (goodness map 650, FIG. 6). Each image portion having a goodness value of 1, such as non-defective pixels 713–718, is indicated by a grey shading. Similarly, each image portion having a goodness value of 0, such as defective pixels 710–712, is indicated by a white background. Recall that goodness map 650 may include a mapping of an evaluation of image portions of original image 105 (FIG. 1), wherein the evaluation includes comparing the potential benefit of correcting a defective portion against the potential damage caused by the correction. In this case, a value of 1 in goodness map 650 indicates that either the associated image portion is defect-free or that the potential damage could exceed the benefit of correction of the image portion. Likewise, a value of 0 in goodness map 650 indicates that the associated image portion is defective and that the potential benefit of correction exceeds the potential damage. The term "non-defective," as used herein, shall refer to the property of having no defect or having a degree of defectiveness, but where correction of the defect could potentially cause more damage than benefit. Similarly, the term "defective," as used herein, shall refer to the property of having a degree of defectiveness and where the correction of the defect is potentially more beneficial than harmful.

In at least one embodiment, defective image portions are created by cloning or reproducing image information from non-defective image portions near the defective image portions to correct the damage caused by a defect. A variety of methods may be used to determine which non-defective image portion or portions are to be used for cloning. In one embodiment, cloning is dependent on the direction of the underlying image (reference image 700). For example, it could be determined that the direction of reference image 700 in the region of defective pixel 711 could be horizontal direction 707. In this case, it is probable that the information of non-defective pixel 717, such as texture, intensity, hue, and the like, is similar or the same as the information that would be present in defective pixel 711 without a defect because of the direction of the underlying image in the area of pixels 710 and 717. For example, if an image (reference image 700) includes an image of a number of very thin horizontal black stripes on a white background, the region around a black pixel could be said to have a horizontal direction. Accordingly, it is more likely that a pixel located horizontal to the black pixel would have the same or similar information as the black pixel (i.e., black color). Likewise, it is less likely that a pixel located vertically to the black pixel would have the same or similar information. For example, if the black pixel were on the top edge of one of the horizontal stripes, cloning the color information from a pixel above, or vertical, to the black pixel would result in erroneously cloning a white color value for the color value of the black pixel.

In another embodiment, information for a defective image portion is cloned from an image portion that is one fundamental wavelength away. For example, it could be determined that defective pixel 710, having image direction 706, has a spatial frequency of 2 pixels. In this case, information from a pixel located two pixels from defective pixel 710 could be reproduced in defective pixel 710. For example, pixel information from non-defective pixel 715 or 716 may be cloned, or using the underlying image direction around pixel 710 (direction 706), information from pixel 713 or 714 may be used.

The non-defective image portions used for cloning, in one embodiment, are based on the frequency components of the defective image portions. For example, a non-defective pixel (non-defective pixel 718) having a similar frequency content as defective pixel 712 lying in direction 705 could be used for cloning. It will be appreciated that, in many cases, image portions having a given frequency component are more likely to be similar to other images having a similar frequency component.

More than one non-defective image portion, in one embodiment, is used for correcting a defective image portion by cloning. For example, defective pixel 710 could average the pixel intensity values from non-defective pixels 713 and 714. As a result, there could be a smoother transition from pixel 713 to pixel 710 to pixel 714 in direction 706 since the values could gradually change. Note that in one embodiment a combination of the previous methods may be used. For example, more than one non-defective image portion having similar frequency components and which are lying in the direction of the underlying image around a defective image portion may be averaged, and the resulting value could be cloned as the value for the defective pixel.

As a result of cloning the information associated with one or more non-defective image portions for each defective image portion of reference image 700, improved image 700 is generated. Improved image 700, as a result of the correction process, can have improved image quality and/or visual appeal since information from surrounding image components is cloned when appropriate.

Figure 8:
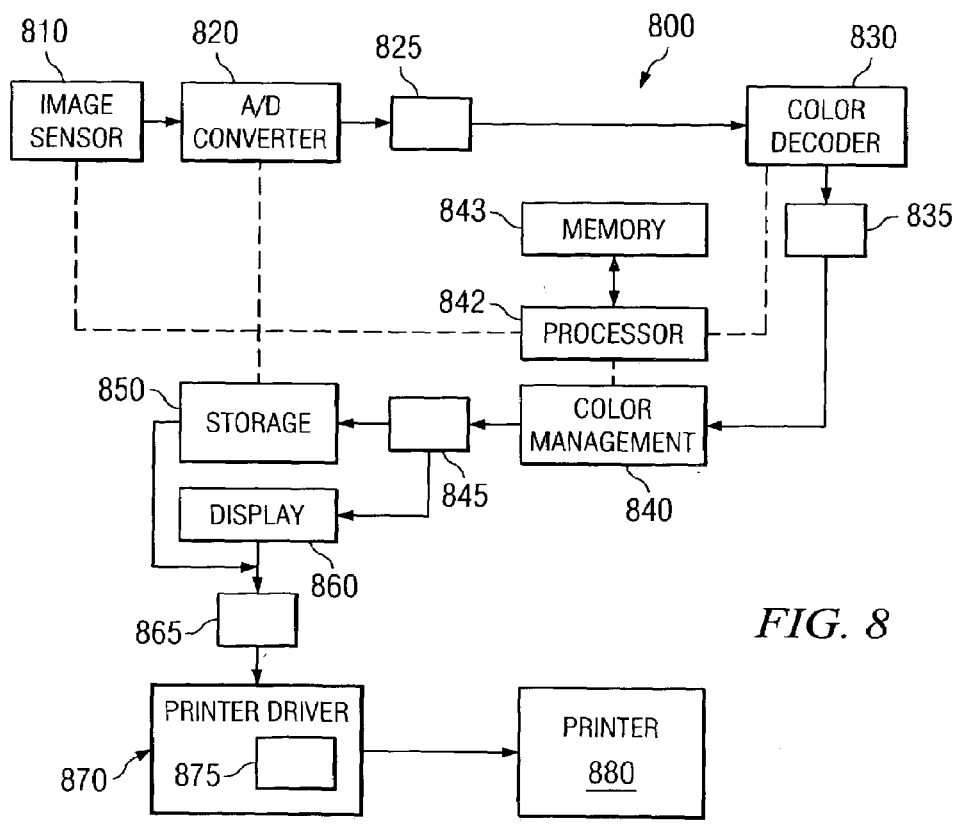
FIG. 8 is a block diagram illustrating a method for defect correction using pyramidal decomposition according to at least one embodiment of the present invention.

Referring to FIG. 8, a method for implementing correction method 200 (FIG. 2) using pyramidal decomposition is illustrated according to at least one embodiment of the present invention. By recursively performing a series of operations at a higher level on the results from a lower level in pyramid method 800, defect correction occurs at each pyramid level with a different cloning radius since the resolution is decomposed at each level. Likewise, by combining the results of a lower level with the results of the performed operations, improved image 150 can be generated, where improved image 150 has improved image quality and/or visual appeal. In at least one embodiment, pyramid method 800 requires less processing time or effort since there is a decrease in the amount of information to process at each pyramidal level compared to the previous level. Pyramidal method 800 may be implemented using an executable set of instructions, a state machine, combinational logic, and the like.

Pyramid method 800 commences when reference image 700 and goodness map 650 are multiplied in multiplication module 850. Reference image 700 and goodness map 650 may be generated using a variety of method discussed previously. The results of this multiplication are downsized by a predetermined decomposition ratio for a desired number of pyramid levels using downsize modules 810–813 (four levels are illustrated in FIG. 8). Similarly, at each level goodness map 650 is downsized by the same decomposition ratio.

At each level, the outputs of downsize modules 810–813 (or multiplication module 850) are divided by the downsized goodness map 650 of the same level by division modules 855–859. The outputs of division modules 855–859 are upsized or reconstructed by upsize modules 820–821 at each level. The output of an upsize module (upsize modules 820–821) from a lower level are subtracted by a subtraction module (subtraction modules 860–863) from the output of a division module (division module 855–859) of a higher level. The output of the subtraction module at each level is multiplied by the downsized goodness map 650 of the level by a multiplication module (multiplication module 851–854) at that level. The output of the multiplication module at each level is upsized by an upsize module (upsize modules 830–833) and then are added to the output of the multiplication module of the next higher level by an addition module at that level (addition module 865–868). For example, the output of multiplication module 850 is divided by the output of downsize module 840 by division module 855. The output from upsize module 820 is then subtracted from the output of division module 855 by subtraction module 860. The output of subtraction module 860 is multiplied by goodness map 650, and the results are added to the output of upsize module 830 by addition module 830. As a result of these operations performed on each level and then the results used in the next higher level, improved image 150 may be generated from the output of addition module 865.

Figure 9:
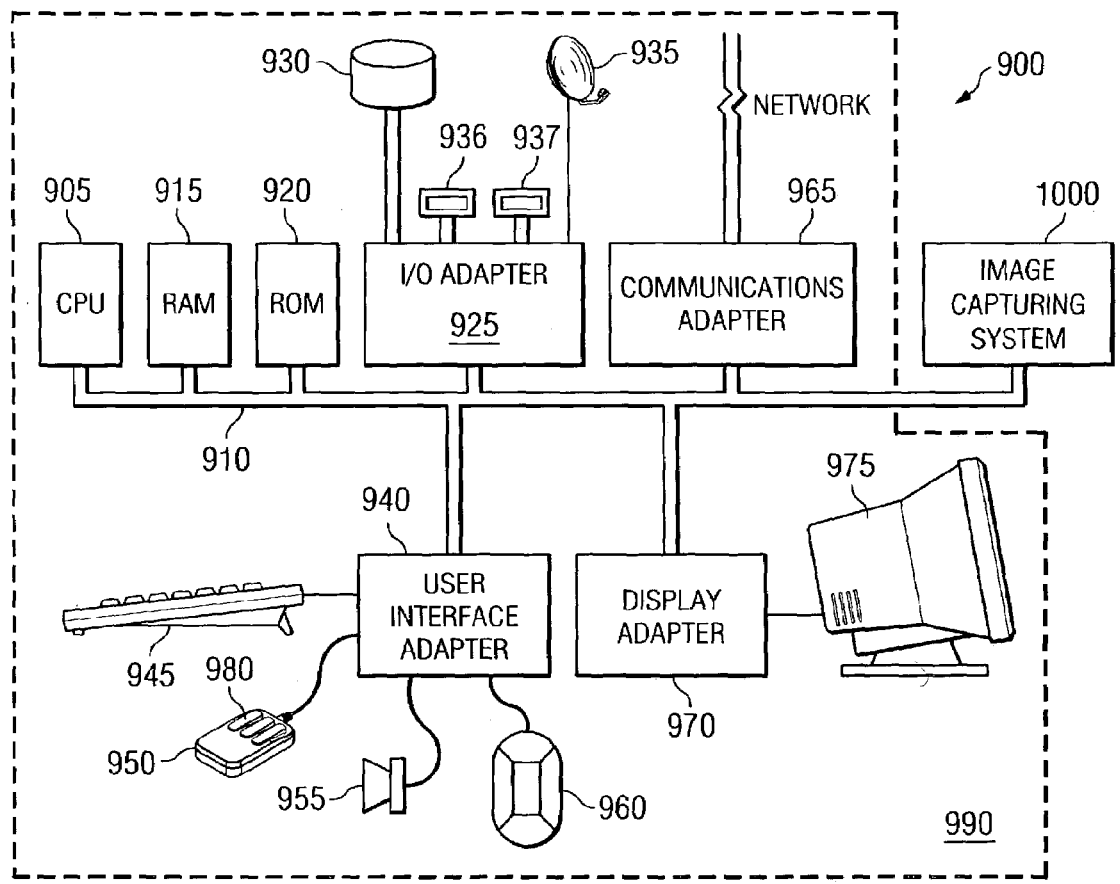
FIG. 9 is a block diagram illustrating an image processing system according to at least one embodiment of the present invention.

In at least one embodiment, one or more methods or processes discussed previously are implemented using a set of instructions to be executed by an image processing system. Referring now to FIG. 9, image processing system 900 is illustrated according to at least one embodiment of the present invention. Image processing system 900 includes processing system 990 and image capturing system 1000. Processing system 990 includes a central processing unit 905, such as a conventional microprocessor, and a number of other units interconnected via at least one system bus 910. In one embodiment, processing system 990 and image capturing system 1000 are separate systems interconnected for functionality. For example, processing system 990 may be a desktop computer, and image capturing system 1000 may be a flatbed scanner. In this example, the scanner is configured to depend upon the desktop computer for image processing and control functions. In another embodiment, processing system 990 and image capturing system 1000 are part of a single physical unit, such as a xerographic reproduction machine, a facsimile machine, an optical character recognition system, a flatbed scanner, etc.

One embodiment of processing system 990 is shown in FIG. 9. In this embodiment, processing system 990 is shown as an integral part of image processing system 900, and includes random excess memory (RAM) 915, read-only memory (ROM) 920 wherein the ROM 920 could also be erasable programmable read-only memory (EPROM) or electrically erasable programmable read-only memories (EEPROM), and input/output (I/O) adapter 925 for connecting peripheral devices such as disk units 930, tape drives 935, CD recorders 936, or DVD recorders 937 to system bus 910, a user interface adapter 940 for connecting keyboard 945, mouse 950, speaker 955, microphone 960, and/or other user interface devices to system bus 910, communications adapter 965 for connecting processing system 990 to an information network such as the Internet, and display adapter 970 for connecting system bus 910 to a display device such as monitor 975. Mouse 950 has a series of buttons 980, 985 and is used to control a cursor shown on monitor 975. Image processing system 900 includes both processing system 990, and image capturing system 1000. It will be understood that processing system 990 may include other suitable data processing systems without departing from the scope of the present invention.

Figure 10:
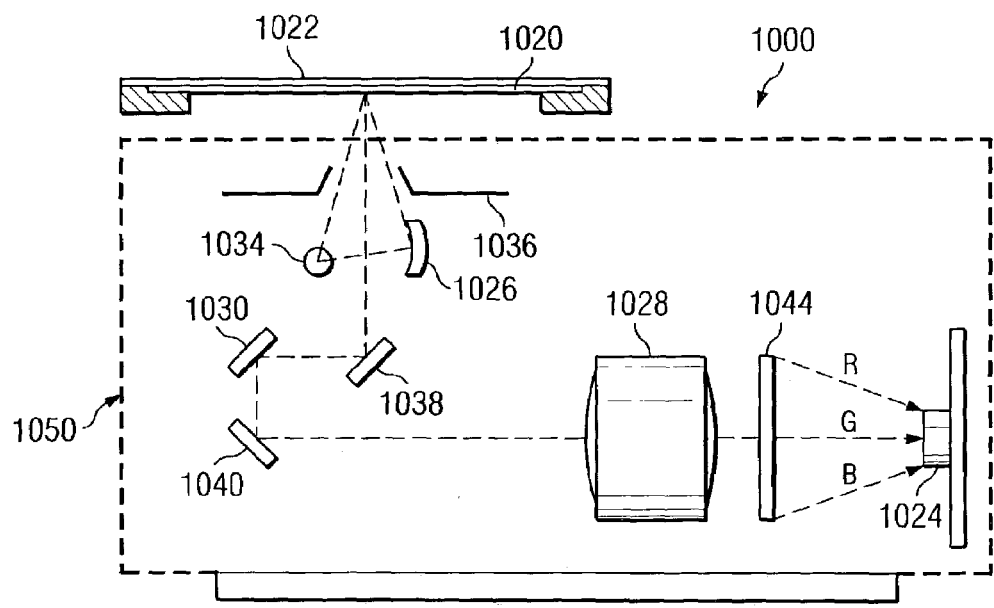
FIG. 10 is a block diagram illustrating an image capturing system according to at least one embodiment of the present invention.

As previously discussed, in at least one embodiment, multiple scans of original image 105 (FIG. 1) having different light source angles and/or light composition are used in at least one implementation of the present invention. In this case, the multiple scans may be captured using a variety of image capturing systems, such as a digital camera, a film scanner, a flatbed scanner, and the like. Referring now to FIG. 10, image capturing system 1000 is illustrated according to one embodiment of the present invention. Image capturing system 1000 incorporates transparent platen 1020 on which physical medium 1022 (such as original image 105, FIG. 1) to be copied or scanned can be located. In one implementation, one or more photosensitive arrays 1024 are supported for reciprocating scanning movement below platen 1020. In yet another implementation, additional photosensitive arrays (not shown for ease of illustration) may be positioned above and below platen 1020, and may or may not be configured to move along platen 1020. Scanning system assembly 1050 includes several optical components, which may move together as a single unit. In one embodiment, scanning system assembly 1050 includes light source 1034, associated reflector 1026 and baffle 1036, with the latter two elements cooperating to direct a narrow band of light onto a small area across the platen 1020. Also included in assembly 1050 is lens 1028, and mirrors 1030, 1038 and 1040, which operate together to focus the light band reflected from the document being scanned, through lens 1028 and color sensor 1044, where light from the light band is filtered into separate color sources, and onto array 1024. Array 1024 produces electrical image signals representative of physical medium 1022. These signals may be output to disk units 930, tape units 935, RAM 915, display adapter 970 for display on display unit 975, or to another device coupled to processing system 990 via a network for image processing.

Scanning array 1024 may be a linear array of photosensitive sensors such as charge coupled devices, photo-diodes, complementary metal-oxide semiconductor (CMOS) devices, or any suitable photodetector that operates to sense light reflected from or transmitted through an image formed in physical medium 1022 during the illumination period.

The photosensitive sensors produce electrical signals indicative of the amount of light sensed. These electrical signals may be output for use by CPU 905 in assimilating an electronically stored representation of physical medium 1022, or measurement of an attribute of physical medium 1022 such as image density. Scanning array 1024 generally extends in a direction transverse to that of the motion of scanning system assembly 1050. This enables scanning system assembly 1050 to move along an axis known to those skilled in the art as the "slow scan" axis, which begins at one end of physical medium 1022 and extends in the process direction toward the opposite end. The direction across the page in which the array extends is known as the fast scan axis. It will be appreciated that, in some cases, only some parts of image capturing system 1000, such as mirrors 1030, 1038, 1040 are the only parts that may move in the process of scanning a physical medium. Additionally, it will be appreciated that movement of scanning system assembly 1050 is described relative to a document being scanned, and that the physical medium may be moved rather than the scanning assembly. Therefore, while reference might be made herein to "movement" of one or more specific system elements and/or in a particular manner, any such references include any relative repositioning of applicable elements whereby capturing is provided in a manner consistent with at least one embodiment of the present invention.

One of the preferred implementations of the present invention is as sets of computer readable instructions resident in the random access memory of one or more processing systems configured generally as described in FIGS. 1–10. Until required by the processing system, the set of instructions may be stored in another computer readable memory, for example, in a hard disk drive or in a removable memory such as an optical disk for eventual use in a CD drive or DVD drive or a floppy disk for eventual use in a floppy disk drive. Further, the set of instructions can be stored in the memory of another image processing system and transmitted over a local area network or a wide area network, such as the Internet, where the transmitted signal could be a signal propagated through a medium such as an ISDN line, or the signal may be propagated through an air medium and received by a local satellite to be transferred to the processing system. Such a signal may be a composite signal comprising a carrier signal, and contained within the carrier signal is the desired information containing at least one computer program instruction implementing the invention, and may be downloaded as such when desired by the user. One skilled in the art would appreciate that the physical storage and/or transfer of the sets of instructions physically changes the medium upon which it is stored electrically, magnetically, or chemically so that the medium carries computer readable information. The preceding detailed description is, therefore, not to be taken in a limiting sense, and the scope of the present invention is defined only by the appended claims.

In the preceding detailed description of the figures, reference has been made to the accompanying drawings which form a part thereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical, chemical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   determining a degree of defectiveness of an image portion;
   evaluating, based at least in part on a degree of defectiveness, a benefit of correcting the image portion and damage that would be caused by correcting the image portion; and
   correcting the image portion if the benefit of correcting the image portion is greater than the damage that would be caused by correcting the image portion;
   wherein determining the degree of defectiveness of an image portion includes:
   recording a first representation of the image portion using a light source having a first position relative to the image;
   recording a second representation of the image portion using a light source having a second position relative to the image, the second position different from the first position;
   low-pass filtering the first representation to generate a first filtered representation;
   low-pass filtering the second representation to generate a second filtered representation;
   dividing the first representation by the first filtered representation to generate a first output; and
   dividing the second representation by the second filtered representation to generate a second output.

2. The method as in claim 1, wherein evaluation includes determining a ratio of the benefit to the damage.

3. The method as in claim 2, wherein the ratio is compared with a threshold.

4. The method as in claim 1, wherein:
   the benefit is proportional to the degree of defectiveness of the image portion; and
   damage is proportional to a degree of signal that would be removed by correcting the image portion.

5. The method as in claim 1, wherein evaluating includes comparing an estimate of a signal strength of the image portion to a threshold value, the threshold value dependent on an expected signal strength of the image portion.

6. The method as in claim 1, wherein the degree of defectiveness is determined in relation to image detail in areas of the image surrounding the image portion.

7. The method as in claim 1, further comprising:
   comparing the first output and the second output; and
   outputting a signal strength estimate based on the comparison, wherein:
   the lesser of the first output and the second output is output as the signal strength estimate when both the first output and the second output are greater than one;
   the greater of the first output and the second output is output as the signal strength estimate when both the first output and the second output are less than one; and a value of one is output as the signal strength estimate when one of the first output and the second output is greater than one, and the other of the first output and the second output is less than one.

8. The method as in claim 1, further including estimating a defect strength, wherein the defect strength is an absolute value of a difference between the first output and the second output.

9. The method as in claim 1, further including performing a grow operation on the image portion followed by a shrink operation on the image portion.

10. The method as in claim 9, wherein:
the grow operation is performed over a radius of four; and
the shrink operation is performed over a radius of three.

11. The method as in claim 9, wherein radii of the grow operation and the shrink operation may be independently changed.

12. The method as in claim 1, wherein evaluation includes generating a goodness map of an image based on the degree of defectiveness of a plurality of image portions.

13. The method as in claim 1, wherein defective portions of an image are corrected by cloning appropriate non-defective portions of the image into the defective portions.

14. The method as in claim 13, wherein the non-defective portions of the image used for cloning are chosen dependent on the direction of the defective portions.

15. The method as in claim 13, wherein the non-defective portions of the image used for cloning are different for different frequency components of the image.

16. The method as in claim 15, wherein the non-defective portions of the image used for cloning are chosen to be one fundamental wavelength away from the defective portions.

17. The method as in claim 13, wherein cloning includes using non-defective portions of the image on both sides of the defective portions.

18. The method as in claim 1, wherein correcting the image portion includes using pyramidal decompositon.

19. A system comprising:
at least one processor;
memory operably associated with said processor; and
a program of instructions to be stored in the memory and executed by the processor, wherein the program of instructions include instructions to:
determine a degree of defectiveness of an image portion;
evaluate, based at least in part on the degree of defectiveness, a benefit of correcting the image portion and damage that would be caused by correcting the image portion; and
correct the image portion based on the evaluation;
wherein the instructions to determine the degree of defectiveness of an image portion include instructions to:
record a first representation of the image portion using a light source having a first position relative to the image;
record a second representation of the image portion using a light source having a second position relative to the image, the second position different from the first position;
low-pass filter the first representation to generate a first filtered representation;
low-pass filter the second representation to generate a second filtered representation;
divide the first representation by the first filtered representation to generate a first output; and
divide the second representation by the second filtered representation to generate a second output.

20. The system as in claim 19, wherein the instructions to evaluate include instructions to determine a ratio of the benefit to the damage.

21. The system as in claim 20, wherein the instructions to evaluate include instructions to compare the ratio with a threshold.

22. The system as in claim 19, wherein:
the benefit is proportional to the degree of defectiveness of the image portion; and the damage is proportional to a degree of signal that would be removed by correcting the image portion.

23. The system as in claim 19, wherein the instructions to evaluate include instructions to compare an estimate of a signal strength of the image portion to a threshold value, the threshold value dependent on an expected signal strength of the image portion.

24. The system as in claim 19, wherein the degree of defectiveness is determined in relation to image detail in areas of the image surrounding the image portion.

25. The system as in claim 19, wherein said program of instructions further includes instructions to:
compare the first output and the second output; and
output a signal strength estimate based on the comparison wherein;
the lesser of the first output and the second output is output as the signal strength estimate when both the first output and the second output are greater than one;
the greater of the first output and the second output is output as the signal strength estimate when both the first output and the second output are less than one; and
a value of one is output as the signal strength estimate when one of the first output and the second output is greater than one, and the other of the first output and the second output is less than one.

26. The system as in claim 19, wherein said program of instructions further includes instructions to estimate a defect strength, wherein the defect strength is an absolute value of a difference between the first output and the second output.

27. The system as in claim 19, wherein said program of instructions further includes instructions to perform a grow operation on the image portion followed by a shrink operation on the image portion.

28. The system as in claim 27, wherein:
the grow operation is performed over a radius of four; and
the shrink operation is performed over a radius of three.

29. The system as in claim 28, wherein radii of the grow operation and the shrink operation may be independently changed.

30. The system as in claim 19, wherein the instructions to evaluate include instructions to generate a goodness map of an image based on the degree of defectiveness of a plurality of image portions.

31. The system as in claim 19, wherein defective portions of an image are corrected by cloning appropriate non-defective portions of the image into the defective portions.

32. The system as in claim 31, wherein the non-defective portions of the image used for cloning are chosen dependent on the direction of the defective portions.

33. The system as in claim 32, wherein the non-defective portions of the image used for cloning are different for different frequency components of the image.

34. The system as in claim 32, wherein the non-defective portions of the image used for cloning are chosen to be one fundamental wavelength away from the defective portions.

35. The system as in claim 32, wherein cloning includes using non-defective portions of the image on both sides of the defective portions.

36. The system as in claim 19, wherein correcting the image portion includes using pyramidal decomposition.

37. A computer readable medium tangibly embodying a program of instructions, said program of instructions including instructions to:
   determine a degree of defectiveness of an image portion;
   evaluate, based at least in part on the degree of defectiveness, a benefit of correcting the image portion and damage that would be caused by correcting the image portion; and
   determine whether to correct the image portion based on the evaluation;
   wherein the instructions to determine the degree of defectiveness of an image portion include instructions to:
   record a first representation of the image portion using a light source having a first position relative to the image;
   record a second representation of the image portion using a light source having a second position relative to the image, the second position different from the first position;
   low-pass filter the first representation to generate a first filtered representation;
   low-pass filter the second representation to generate a second filtered representation;
     divide the first representation by the first filtered representation to generate a first output; and
     divide the second representation by the second filtered representation to generate a second output.

38. The computer readable medium as in claim 37, wherein the instructions to evaluate include instructions to determine a ratio of the benefit to the damage.

39. The computer readable medium as in claim 37, wherein the instructions to evaluate include instructions to compare the ratio with a threshold.

40. The computer readable medium as in claim 38, wherein:
   the benefit is proportional to the degree of defectiveness of the image portion and the damage is proportional to a degree of signal that would be removed by correcting the image portion.

41. The computer readable medium as in claim 38, wherein the instructions to evaluate include instructions to compare an estimate of a signal strength of the image portion to a threshold value, the threshold value dependent on an expected signal strength of the image portion.

42. The computer readable medium as in claim 38, wherein the degree of defectiveness is determined in relation to image detail in areas of the image surrounding the image portion.

43. The computer readable medium as in claim 37, wherein said program of instructions further includes instructions to:
   compare the first output and the second output; and
     output a signal strength estimate based on the comparison wherein;
   the lesser of the first output and the second output is output as the signal strength estimate when both the first output and the second output are greater than one;
   the greater of the first output and the second output is output as the signal strength estimate when both the first output and the second output are less than one; and
   a value of one is output as the signal strength estimate when one of the first output and the second output is greater than one, and the other of the first output and the second output is less than one.

44. The computer readable medium as in claim 43, wherein said program of instructions further includes instructions to estimate a defect strength, wherein the defect strength is an absolute value of a difference between the first output and the and the second output.

45. The computer readable medium as in claim 38, wherein said program of instructions further includes instructions to perform a grow operation on the image portion followed by a shrink operation on the image portion.

46. The computer readable medium as in claim 45, wherein:
   the grow operation is performed over a radius of four; and
     the shrink operation is performed over a radius of three.

47. The computer readable medium as in claim 46, wherein radii of the grow operation and the shrink operation may be independently changed.

48. The computer readable medium as in claim 38, wherein the instructions to evaluate include instructions to generate a goodness map of an image based on the degree of defectiveness of a plurality of image portions.

49. The computer readable medium as in claim 38, wherein defective portions of an image are corrected by cloning appropriate non-defective portions of the image into the defective portions.

50. The computer readable medium as in claim 49, wherein the non-defective portions of the image used for cloning are chosen dependent on the direction of the defective portions.

51. The computer readable medium as in claim 50, wherein the non-defective portions of the image used for cloning are different for different frequency components of the image.

52. The computer readable medium as in claim 49, wherein the non-defective portions of the image used for cloning are chosen to be one fundamental wavelength away from the defective portions.

53. The computer readable medium as in claim 50, wherein cloning includes using non-defective portions of the image on both sides of the defective portions.

54. The computer readable medium as in claim 38, wherein correcting the image portion includes using pyramidal decomposition.

* * * * *